US012699638B2

(12) United States Patent
Bouchkara

(10) Patent No.: US 12,699,638 B2
(45) Date of Patent: Aug. 4, 2026

(54) SYSTEM AND METHOD FOR VIRTUALIZATION SOFTWARE MANAGEMENT IN A WIRELESS NETWORK

(71) Applicant: RAKUTEN MOBILE, INC., Tokyo (JP)

(72) Inventor: Jalloul Bouchkara, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 826 days.

(21) Appl. No.: 17/923,474

(22) PCT Filed: Sep. 15, 2022

(86) PCT No.: PCT/US2022/043582
§ 371 (c)(1),
(2) Date: Mar. 21, 2024

(87) PCT Pub. No.: WO2024/058777
PCT Pub. Date: Mar. 21, 2024

(65) Prior Publication Data
US 2024/0232038 A1     Jul. 11, 2024

(51) Int. Cl.
*G06F 11/30* (2006.01)
*H04W 24/04* (2009.01)
(52) U.S. Cl.
CPC ......... *G06F 11/3072* (2013.01); *H04W 24/04* (2013.01)
(58) Field of Classification Search
CPC ............ G06F 11/3072; G06F 9/44505; H04W 24/04; H04W 24/08; H04W 24/02;
(Continued)

(56) References Cited

U.S. PATENT DOCUMENTS

| | | | | |
|---|---|---|---|---|
| 2012/0196644 A1* | 8/2012 | Scherzer | ............... | H04W 72/02 455/524 |
| 2017/0235585 A1* | 8/2017 | Gupta | ..................... | H04L 67/12 718/1 |

FOREIGN PATENT DOCUMENTS

| | | | | |
|---|---|---|---|---|
| KR | 102796678 B1 * | 4/2025 | ......... | H04L 43/0852 |
| WO | WO-2022081063 A1 * | 4/2022 | ............ | H04W 24/10 |

OTHER PUBLICATIONS

WO-2022081063-A1 text from PE2E search (Year: 2025).*
(Continued)

*Primary Examiner* — Ashish Thomas
*Assistant Examiner* — Kayo Lisa Rusin
(74) *Attorney, Agent, or Firm* — Sughrue Mion, PLLC

(57) ABSTRACT

A server cluster includes at least one server processor, which executes a virtual control unit (VCU) thereon. The VCU is configured to selectively control at least one of a plurality of base stations of a wireless communication network. A data set includes a plurality of data samples, each collected by a user device communicatively coupled to the wireless communication network, and each describing features of a communication of the user device with one of the plurality of base stations of the wireless communication network. To isolate software performance issues of the VCU within the wireless communication network, the data samples are selectively filtered according to at least one filtering rule which identifies data samples indicating an undesired performance impact by at least one factor unrelated to the VCU. The resulting filtered data set can then be analyzed to determine compliance of the VCU with at least one performance indicator.

15 Claims, 4 Drawing Sheets

(58) Field of Classification Search
CPC ............. H04L 41/0823; H04L 41/0895; H04L
43/028; H04L 43/022
See application file for complete search history.

(56) References Cited

OTHER PUBLICATIONS

KR102796678 B1 translation (Year: 2025).*
Written Opinion (PCT/ISA/237) dated Jan. 31, 2023 issued by the
International Searching Authority in International Application No.
PCT/US2022/043582.
International Search Report (PCT/ISA/210) dated Jan. 31, 2023
issued by the International Searching Authority in International
Application No. PCT/US2022/043582.

* cited by examiner

300

SYSTEM AND METHOD FOR VIRTUALIZATION SOFTWARE MANAGEMENT IN A WIRELESS NETWORK

CROSS REFERENCE TO RELATED APPLICATIONS

This application is a National Stage of International Application No. PCT/US2022/043582, filed Sep. 15, 2022.

BACKGROUND

1. Field

Apparatuses and methods consistent with example embodiments relate to use of cloud virtualization in a wireless network, and more particularly, to the identification and isolation of performance issues arising from the use of virtualization software, and the reduction of said issues through optimization of the software configuration.

2. Description of Related Art

Many wireless telecommunications systems, such as mobile telephone networks, use radio access network (RAN) base stations to establish wireless connections with user devices, such as telephones. A RAN base station includes a radio that converts between device-readable data and transmissible signals, an antenna which transmits and receives signals between the station and the user devices, and a baseband unit which operates the software functions enabling and directing the other hardware components.

Each base station has an effective range and therefore an effective area of coverage. An efficient network will distribute its base stations to balance the goals of minimizing overlap and of avoiding gaps in coverage.

Because base stations are expensive to build, impractical to relocate, and complex to upgrade, it was previously difficult for a wireless provider to adapt to changing circumstances in network use. For example, an unexpected increase in population within a single base station's area of coverage could result in network activity beyond the capacity of the base station to manage.

Recently, RAN systems have begun making use of cloud virtualization to manage at least some of the baseband unit functions remotely. This permits a degree of flexibility in the network without the need for more base stations: an over-worked baseband unit can divert software functions to virtual control units (VCUs) running on cloud servers.

SUMMARY

It is an object of the disclosed system and method to identify and isolate performance issues in a network specifically arising from virtualization software.

It is another object of the disclosed system and method to accomplish the identification using data already typically collected for other purposes.

It is yet another object of the disclosed system and method to optimize the configuration of the virtualization software based on the identification.

In accordance with certain embodiments of the present disclosure, a method is provided for isolating software performance issues in a wireless communication network. The method may include establishing a server cluster including at least one server processor, the server processor executing a virtual control unit (VCU) thereon. The VCU may be configured to selectively control at least one of a plurality of base stations of the wireless communication network. The method may further include establishing a data set including a plurality of data samples. Each data sample may be collected by a user device communicatively coupled to the wireless communication network, and may describe features of a communication of the user device with one of the plurality of base stations of the wireless communication network. The method may further include, by a processor, selectively filtering the plurality of data samples of the data set according to at least one filtering rule to generate a filtered data set. The filtering rule may identify data samples indicating an undesired performance impact by at least one factor unrelated to the VCU. The method may further include, by a processor, analyzing the filtered data set to determine compliance of the VCU with at least one performance indicator.

In accordance with other embodiments of the present disclosure, a non-transitory computer-readable recording medium is provided. The recording medium may have recorded thereon instructions executable by at least one processor to perform a method for isolating software performance issues in a wireless communication network. The method may operate in relation to a server cluster including at least one server processor, where the server processor executes a virtual control unit (VCU) thereon which is configured to selectively control at least one of a plurality of base stations of the wireless communication network. The method may include receiving a data set including a plurality of data samples. Each data sample may be collected by a user device communicatively coupled to the wireless communication network, and may describe features of a communication of the user device with one of the plurality of base stations of the wireless communication network. The method may further include selectively filtering the plurality of data samples of the data set according to at least one filtering rule to generate a filtered data set. The filtering rule may identify data samples indicating an undesired performance impact by at least one factor unrelated to the VCU. The method may further include analyzing the filtered data set to determine compliance of the VCU with at least one performance indicator.

In accordance with still other embodiments of the present disclosure, an electronic device is provided for isolating software performance issues in a wireless communication network. The electronic device may include at least one memory configured to store computer program code, and at least one processor configured to operate as instructed by the computer program code. The computer program code may include reception code configured to cause at least one of the at least one processor to receive a data set including a plurality of data samples. Each data sample may be collected by a user device communicatively coupled to the wireless communication network, and may describe features of a communication of the user device with one of a plurality of base stations of the wireless communication network. A server processor of the wireless communication network may execute a virtual control unit (VCU) thereon to selectively control at least one of the plurality of base stations. The computer program code may further include filtering code configured to cause at least one of the at least one processor to selectively filter the plurality of data samples of the data set according to at least one filtering rule to generate a filtered data set. The filtering rule may identify data samples indicating an undesired performance impact by at least one factor unrelated to the VCU. The computer program code may further include analysis code configured to cause at least one of the at least one processor to analyze the filtered data set to determine compliance of the VCU with at least one performance indicator.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1A:
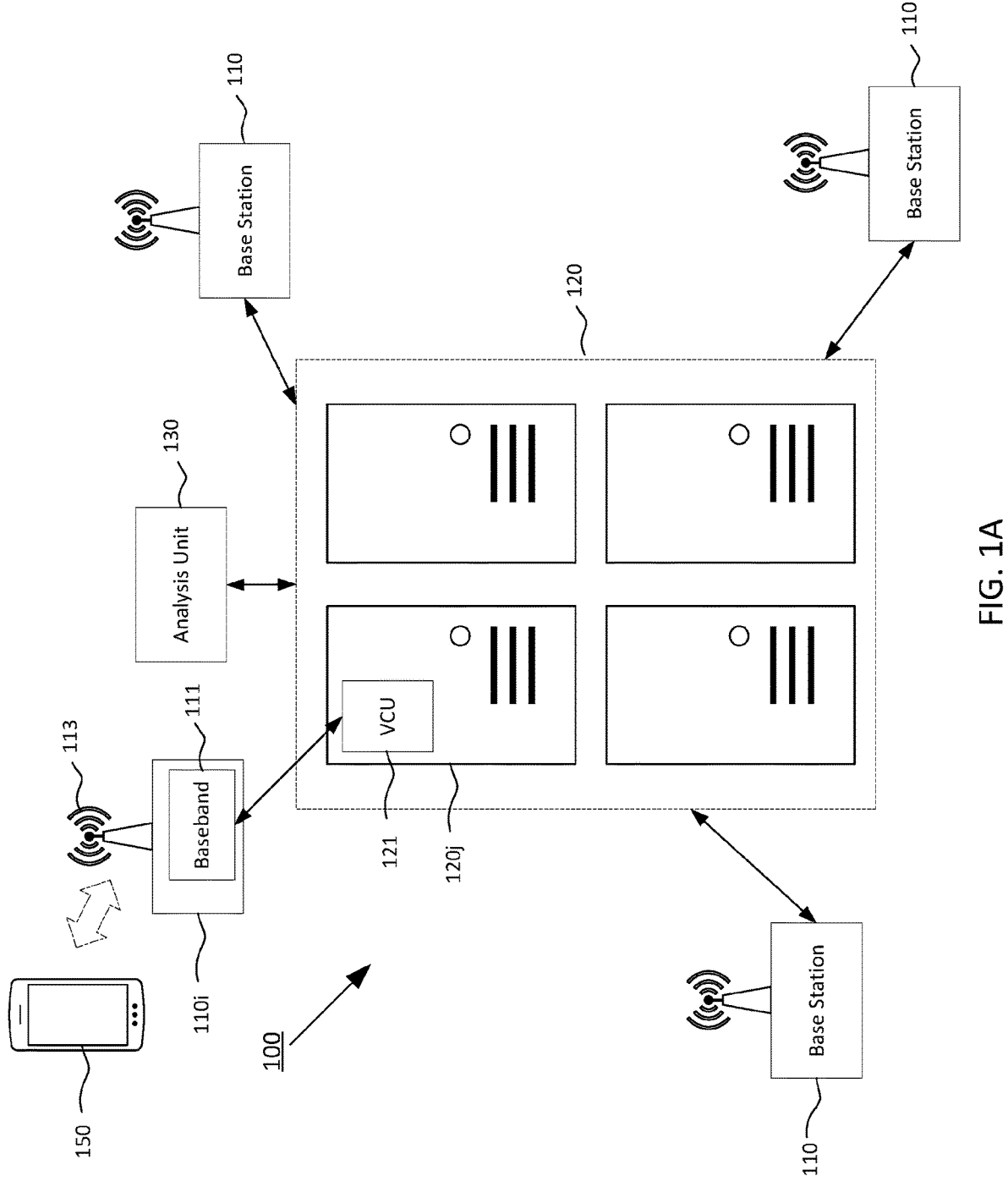
FIG. 1A is a block diagram of an example wireless communication network in which embodiments of the systems and/or methods described herein may be implemented.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is noted that the principles disclosed herein are generally applicable to many forms of networks, including but not limited to internet service provider networks such as optical fiber and cable networks; traditional phone networks; and both wired and wireless networks in a structure, complex, or other localized area. However, throughout the disclosure, the network being analyzed and managed by the disclosed system will be primarily referred to as a mobile telephone network or "mobile network" using a radio access network configuration, for convenience and clarity purposes.

As discussed briefly in the Background, the most recent generations of radio access network (RAN) systems have enabled and implemented virtual control units (VCUs) on server clusters to distribute the processing load of the system, particularly of the baseband units of the RAN base stations.

FIG. 1A is a diagram of an illustrative wireless communication network 100 in which embodiments of the systems and/or methods described herein may be implemented, in accordance with an exemplary embodiment.

The wireless communication network 100 includes a plurality of base stations 110 and a cluster of servers 120. Each of the plurality of base stations 110 is communicatively coupled to the cluster of servers 120. One of the depicted base stations is more specifically identified as base station 110i, and one of the servers is more specifically identified as server 120j. For ease of illustration, only four base stations 110 and four servers 120 are depicted, but it will be recognized that any arbitrary number of base stations 110 and/or servers 120 is within the scope of the claims.

Each base station 110 has a baseband unit (also known as a "control unit") executing thereon, and each server in the cluster 120 has a virtual control unit (VCU) executing thereon. For convenient of depiction, only the baseband unit 111 of base station 110i and the VCU 121 of server 120j are depicted in FIG. 1A. As depicted in the example of FIG. 1A, baseband unit 111 and VCU 121 are presently coupled to share operations and processing load therebetween, according to the configuration of the VCU 121. It is noted that the present coupling of base station 110i and server 120j through their respective baseband unit 111 and VCU 121 is arbitrary; according to the nature of virtualization, base station 110i can couple to any server in the server cluster 120, and server 120j can couple to any base station 110 in the plurality of base stations.

In fifth generation (5G) networks, a base station typically has a distributed unit associated with it (not depicted), which manages certain "mid-level" operations between the base station and the core network, relieving some of the processing load from the base station itself. This distributed unit can be physically located at or near a base station, or among a small group of base stations and manage operations for each. Additionally, like the baseband unit 111, some or all of the operations of a distributed unit can be virtualized in the server cluster 120, in a virtual distributed unit (VDU), producing much the same benefits. Many of the same principles described herein with regard to VCUs also apply to both distributed units and VDUs. For simplicity and brevity of description, consideration of the distributed unit and any corresponding VDU is omitted going forward; however, it is noted that configuration of these components may be optimized in much the same manner as will be described for the VCU.

As depicted in the example of FIG. 1A, a user device 150 (sometimes described as a "user equipment") is presently wirelessly and communicatively coupled to the wireless communication network 110 through an antenna 113 of the base station 110i. As is well-understood in the field, the user device 150 may decouple from base station 110i as it exits an area of coverage of base station 110i, and couple or attempt to couple to another base station 110, in what is known as a "handoff."

The wireless communication network 100 also includes an analysis unit 130, which will be described further herein.

Virtualization is a useful measure to take load off of baseband units which, for various reasons including those previously described, receive too much activity to process by themselves.

However, virtualization can be further exploited for the benefit of optimization of the processing load. Even baseband units that have sufficient processing power for their circumstances can be made to operate faster by redistributing operations to the VCUs, through load balancing and the like. For example, GPU and CPU pinning can be used to move certain functions and services from a baseband unit to its corresponding VCU, such as Forward Error Correction (FEC) or various aspects of Layer 1 (L1) processing.

Additionally, there have been promising developments on Open Radio Access Network (O-RAN) systems in the possibility of shared O-RAN Radio Units (O-RUS). O-RUs manage the lower physical layer and the radio frequency (RF) functions, and interface with the distributed units (O-DUs). While currently an O-RU can only interface with a single O-DU, shared O-RU will permit interfacing with multiple O-DUs, enabling load balancing throughout. Relatedly, baseband unit pooling, also in development, will allow load distribution not only between one baseband unit and its corresponding VCU, but also between all baseband units connected to a VCU.

For simplicity of description, an interaction solely between a single baseband unit and a single VCU will be assumed going forward. However, it will be understood that the principles disclosed herein can be applied to the customizable sharing of functions and/or resources between a local system and any number of connected systems on a network.

In optimization, handling more operations through a VCU will free processing power at the baseband units to handle the remaining operations faster. However, certain priority operations might be more efficient to handle at the baseband unit rather than suffer the additional delay of transmission to the server cluster and back. A balance is therefore necessary, and may require careful fine-tuning by testing and experimentation. Indeed, a precise optimal balance can conceivably vary according to levels of activity, and/or between specific base stations and the nuances of the area.

It is important to test the server cluster operating the VCUs to confirm that everything is operating within desired (or optimal) parameters. Such testing can assist in the aforementioned optimization fine-tuning, and can also confirm the proper functioning of the cluster after other reconfigurations, such as deployment of a VCU software update or the connection of a new server node.

A direct approach to testing the performance of virtualization on the server cluster would be to deliberately gather data specifically for this purpose. However, other data gathering typically already occurs to test the network operation and performance more generally. To avoid redundant testing, which can be time consuming and expensive, ideally this same data could be analyzed to identify issues with VCU operation.

The data samples for general network testing are typically gathered at the user device level. The resulting data set is sometimes referred to as a user equipment log, or UE log.

Each data sample typically describes a variety of features of the communication with the network, such as ping time, data throughput, and latency, as well as an identifier of the base station coupled to the user device, a frequency band on which the communication occurs, and a location of the user device relative to that base station. Signaling messages between the user device, the base station, and the network as a whole, such as NAS messages and packet logs for the various layers (e.g. L1, L2, L3), are also collected, and can be analyzed, particularly in the aggregate, to determine a variety of additional connection and signal characteristics including, but not limited to, signal strength, signal quality, noise, jitter, error rate (block error rate, packet discard rate), and mean opinion score.

A common sampling practice is to cause user devices to travel defined routes through a region of the network while continuously communicating with the network through a download, upload, or other selected form of data communication. Ideally, each route will be defined to move through the areas of coverage of several base stations, such that the user device communicatively couples to the wireless communication network through each of these base stations in series. The data samples are logged to indicate the particular base station communicating with the device at the time of sample, and in certain embodiments the overall travel route. Samples can thereby be gathered to describe the behavior of each of the base stations, and additionally test important network functions such as handoffs between base stations and performance at both close and distance ranges.

Analysis of the data set can then be used to measure network performance against various key performance indicators (KPIs). A KPI is a predefined standard for the operation of the network according to one or more factors, which if not met indicates poor performance that should be corrected. A KPI typically defines a Boolean expression; if the expression is true, the KPI is met; or, to describe it another way, the network or some element of it "complies with" the KPI. The KPI expression may be a comparison of a value of a parameter to a preselected threshold value, or a comparison of two parameter values, among other possibilities. Applicable KPI parameters are numerous and can vary depending on the specifics of the network. A few non-limiting examples are the accessibility and retainability of Voice over New Radio (VoNR), data download, data upload, or other operational protocols; and success rates for Random Access Channel (RACH) connection and various types of base station handovers.

Taken generally, data collected as described above is not descriptive of VCU behavior specifically. Performance at the point of contact with a user device can be undesirably impacted by problems originating at numerous points in the network, including malperforming hardware at the base station, a fault in the transmission protocol, network coverage failure, core network or peer entity behavior, or a variety of issues with the user device, none of which are related to software performance and none of which can be effectively corrected through reconfiguration or optimization of the VCU. Determining KPI compliance on the basis of the gathered data set would not specifically indicate a VCU issue, and would be misleading in determining the best optimization of the VCU configuration or other aspects of the server cluster.

The method and system described herein are based in part on the recognition that omitting particular samples from such a data set during analysis will help to isolate poor performance specifically resulting from VCU operation. More specifically, if it can be determined that a sample indicates network performance being undesirably impacted at least partially due to factors unrelated to the VCU software, the sample is removed from the data set or otherwise ignored during analysis. To the extent that data measured by the sample might also indicate software-related performance issues, it is highly impractical to determine the degree to which performance failures are the result of the software as opposed to the other factors. Such samples can be described as "contaminated" by the issues from other, non-software sources. It is more efficient to rely only on the "uncontaminated" samples in the data set when testing.

In other contexts, omitting "contaminated" samples might leave unacceptable gaps in the testing data. However, the method and system described herein are also based in part on the recognition that, while maximum thoroughness in sampling is strongly advisable for general network testing— particularly to determine the outer bounds of coverage and to identify "dead zones"—such is not relevant for identifying issues with software. To the contrary, due to the nature of virtualization, the effects of an issue with the software deployed to a given server cluster are likely to be distributed more or less evenly throughout the portion of the network operating on the server cluster. As such, in the context of evaluating VCU software performance, the omission of some or even the majority of samples does not harm the accuracy of the analysis.

With this recognition, filters can be applied to the data set to filter out all samples which could possibly be "contaminated," and a KPI compliance test can be applied to the filtered data to determine the performance levels of the virtualization as configured.

Any suitable filter process can be used to remove data samples from the data set, to mask them during the analysis, or to directly instruct the analysis to omit them from consideration. For convenience, all three approaches will be described herein as "filtering out" the samples from the data set.

An optimal configuration of data filters for effectiveness may vary according the configuration of the network, expected performance limitations (e.g. link budget according to the network design, etc.), the specification of the device gathering the data, and what specifically is being tested (e.g. File Transfer Protocol download or upload, Voice Over New Radio quality, etc.). However, example rules for selecting samples to filter which have been identified as generally effective for this purpose include:

Undesirable samples: Filtering out samples with data directly indicating problems unrelated to software performance. That is to say, the data in the sample shows "symptoms" of a non-software issue which has likely contaminated the sample. Such symptoms can include, but are not limited to, a low signal strength (indicated, for example, by a low Reference Signal Received Power (RSRP) value or low Reference Signal Received Quality (RSRQ) value) or excessive noise (indicated, for example, by a low Signal-to-Noise Ratio (SNR) value or low Signal-to-Interference-plus-Noise Ratio (SINR) value). While causes of these symptoms vary, and can include distance from the base station, entry into a transmission "dead zone," outside signal interference, or issues at the point of transmission, they are typically unrelated to software performance. It is also noted that these symptoms will themselves generate other issues which, without the context of the symptoms, could be mistaken for software performance problems. Such samples can be filtered out to produce more accurate results for the needs of an optimization analysis. A suitable filter may be set to filter samples with an RSRP, RSRQ, or SINR value below a selected threshold, which reflects symptomatic behavior. For example, an RSRP below −120 dBm, or an RSRQ below −20 dB, is generally considered to indicate a state of effective signal disconnection, while an SINR value below −2 is generally considered to indicate an incoherent signal. These thresholds and other filter parameters may vary according to the variables previously described as generally affecting an optimal configuration of data filters.

Undesirable base stations: Filtering out samples originating from a base station which has been identified as problematic. A base station may be identified as problematic through other testing and analysis, ideally using the same data set to thereby confirm that the problem existed during the collection of the samples and has contaminated them accordingly. It may also be identified as problematic through direct knowledge; for example, it may be under maintenance, damaged, deliberately taken partially or fully offline, or not yet fully brought online in the first place. When testing a software update, it may also be the case that the update has not been deployed to certain base stations, and their samples can be filtered out as irrelevant to the test. For the same reasons, samples from base stations which are not operating with the server cluster under test can be filtered out as irrelevant. In the samples, the source base station may be identified, for example, by a physical cell identity (PCI), which is a unique numerical identifier in a network. A suitable filter can be set to remove samples associated with any PCI indicated in a provided list of undesirable base stations, or alternatively, with a PCI which is not in a provided list of desirable base stations.

Undesirable frequency bands: Filtering out samples related to transmissions on a particular range of frequencies. Particular ranges are often assigned to certain services or protocols. Either of these might be identified to be problematic through other testing and analysis, ideally using the same data set to confirm that the problem existed during the collection of the samples and has contaminated them accordingly. A frequency range may also be known to be problematic through direct knowledge; for example, an associated service might require hardware which is under maintenance or experiencing errors. When testing a software update, it may also be the case that the update is only related to particular services or protocols, and therefore to the associated frequency ranges; samples related to other frequency ranges can be filtered out as irrelevant to testing. Also irrelevant to the test are samples gathered through other network carriers, due for example to the user device entering a roaming mode; a connection to another network carrier can also be identified through the frequency. In the samples, frequencies may be identified, for example, by E-UTRA Absolute Radio Frequency Channel Number (EARFCN). A suitable filter can be set to remove samples associated with any EARFCN in a selected range.

Undesirable routes: Filtering out samples originating from a particular testing route. As noted previously, samples are commonly gathered on particular travel routes through a variety of areas of coverage. Certain routes may be known, for various reasons, to include performance issues which are not reflective of VCU performance, or to be otherwise irrelevant. Such can include, for example, travel through areas with known poor coverage, such as lengthy tunnels or regions with low base station density, or which connect to base stations associated with a different server cluster than the one being tested. Samples collected on these routes can be filtered out. A variety of suitable identifiers for a source route, to be included in a sample, can be implemented, and a suitable filter can be set to filter out samples associated with any route indicated in a provided list.

The above examples have been kept simple for reasons of brevity of description. It is noted that more nuanced filtering which considers exceptions to the above and other examples is possible. For example, samples during the transition into and out of a roaming mode may be affected by the software's ability to manage such transitions, and the signal strength of samples at the edge of a base station's effective range may be the result of poor handover management failing to transition the connection to a closer or otherwise better base station. Such nuanced and potentially multi-layered filtering is also within the scope of the disclosed system and method.

It is additionally noted that, in certain circumstances, filtering of some samples may be desired simply (or additionally) to reduce the total number of samples being analyzed. For example, a comprehensive UE log gathers 10 GB of data samples per day per user device. It is impractical to analyze all data samples within such logs. The same filtering functionality as described above can be used to select a particular set of samples to analyze, reducing a large sample set to a more reasonable size. Selecting a range or sets of ranges of frequency bands is one effective approach for this purpose, when those ranges have no special significance for VCU performance, and is simple to implement, although other filters are also within the scope of the claims. A filter which selects a subset of samples and/or logs at random may also be suitable.

Once the data set has been filtered according to one or more of the above rules, the samples of the filtered data set can be considered to be sufficiently reflective of VCU behavior for testing and analysis. The sample set is therefore analyzed to determine whether the VCU complies with various selected KPIs, according to whether, for each KPI, the results of the analysis meet a threshold value defined by that KPI. The KPIs and their respective thresholds can be set to describe "optimized" rather than "minimum standard" behavior when specifically testing the effectiveness of an optimization attempt.

In certain embodiments, each filter rule is configured and applied selectively under the control of an analyst. In particular, filter rules may be selectively applied in the determinations for some but not all KPIs. Additionally, when there are multiple data sets produced by different communication behavior—for example, one for data download on an FTP protocol, one for data upload on an FTP protocol, one for continuous data streaming—filter rules may also be selectively applied to some but not all of the data sets.

Figure 1B:
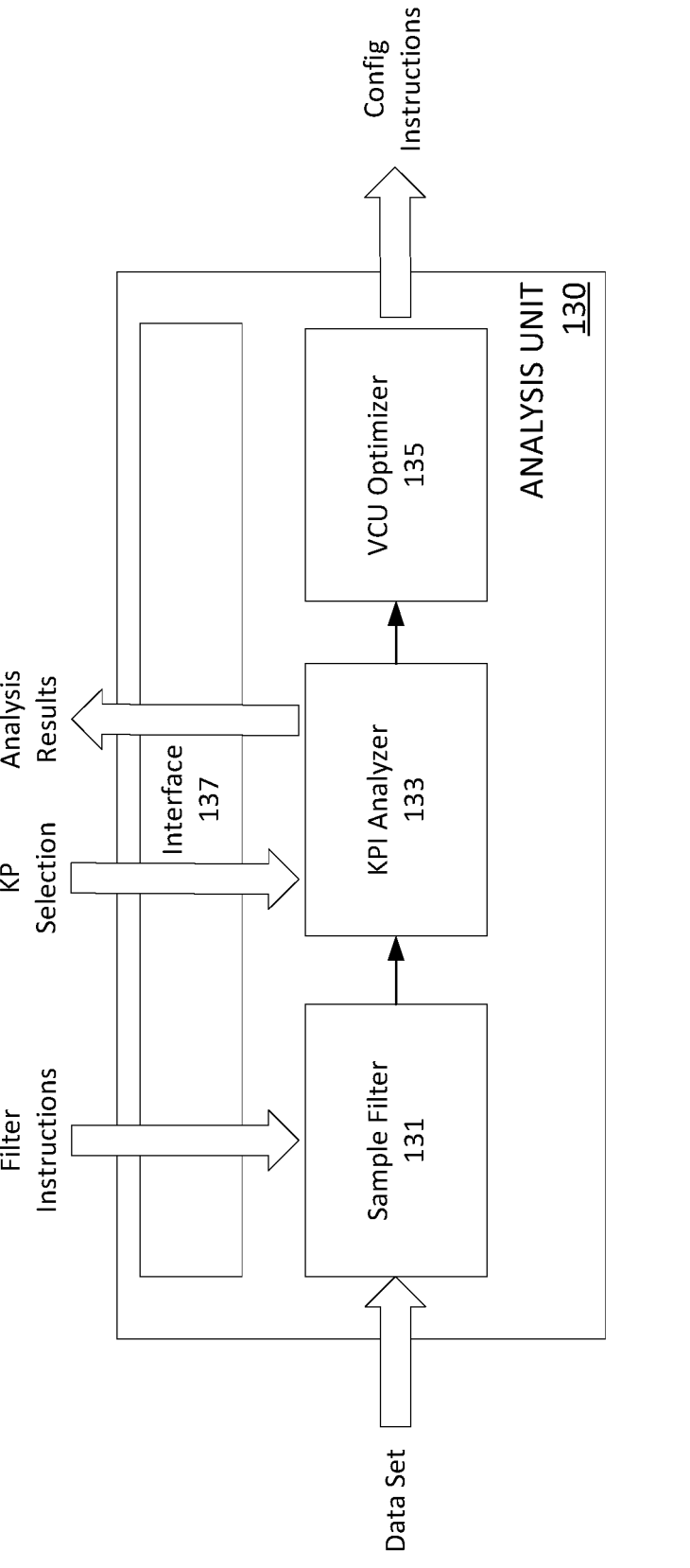
FIG. 1B is a block diagram illustrating the analysis unit 130 of FIG. 1A in more detail, in accordance with an exemplary embodiment.

Returning to the analysis unit 130 first described with reference to FIG. 1A, details of this component in accordance with an exemplary embodiment are depicted in the block diagram of FIG. 1B.

The analysis unit 130 may be implemented as instructions of computer program code, recorded on a non-transitory computer-readable recording medium such as a computer memory, and executed by a processor. The processor may be that of one or more of the servers 120 in the cluster, or of a separate device coupled to the cluster.

In accordance with the depicted embodiment, the analysis unit 130 includes a sample filter 131, a KPI analyzer 133, a VCU optimizer 135, and an analyst interface 137.

The sample filter 131 receives a data set of data samples. Additionally, the sample filter may receive filter instructions defining at least one filtering rule, which may be pre-set or which may be selected and configured by an analyst or other party through the analyst interface 137. If no filter instructions are received, the sample filter 131 provides the data set to the KPI analyzer 133 without alteration. If filter instructions are received, the sample filter 131 applies the filtering rule to the data set, and provides the resulting filtering data set to the KPI analyzer 133.

The KPI analyzer 133 analyzes the data set, or filtered data set, as provided through the sample filter 131. More specifically, the KPI analyzer 133 determines whether the data samples in the data set indicate a compliance with one or more KPIs. These KPIs may be selected and configured by an analyst or other party through the analyst interface 137, either individually or as a set which has been grouped for a general testing purpose. One example of a grouping can be a set of KKIPIs, with set thresholds, intended to indicate optimal performance of a VCU. The KPI analyzer 133 may provide the results of the analysis to an analyst or other party through the analyst interface 137, and may also or alternatively provide the results to the VCU optimizer 135.

The VCU optimizer 135 includes a logic which receives compliance results and, for any failures to comply with a KPI, determines possible optimizations in the configuration of the VCU 121 which will correct for the failure. A description of these optimizations may be provided through the analyst interface 137 for approval or adjustment by an analyst or other party. Once approval is received, the VCU optimizer 135 may send the optimizations as configuration instructions to the server cluster 120, to be implemented in the installations of the VCU 121 on the servers. In certain embodiments, approval is not required, or can be configured to be automatic, and the VCU optimizer 135 sends the configuration instructions automatically.

The analyst interface 137 may be implemented in any suitable format for enabling selection and configuration of filtering rules. The analyst interface 137 may also enable other configuration such as the selection and configuration of KPIs for the KPI analyzer 133 to test against the data set, the selection and/or provision of particular data sets as a starting point, and approval of optimizations.

A general flow of processes for isolating software performance issues in a wireless communication network, in accordance with an exemplary embodiment, will now be described with reference to FIG. 2.

This flow of processes is applied to a server cluster including at least one server processor which is executing a virtual control unit (VCU), such as the cluster of servers 120 and VCU 121 of the wireless communication network 100 illustrated in FIG. 1A. This flow of processes may be executed by a processor as part of the analysis unit 130 illustrated in FIG. 1A.

At 210, a data set of data samples is received. The data samples have been previously collected by one or more user devices while they have been communicatively coupled to the wireless communication network, for example to a set of base stations of the network in sequence.

At 220, the data set is selectively filtered, for example by the sample filter 131.

Specifically, at 221, at least one filtering rule is selected.

At 223, the selected filtering rule is used to identify data samples in the data set which indicate, for some feature of the network behavior, an undesired impact on performance which can be connected to at least one factor unrelated to the VCU. Certain specific filtering rules which can accomplish this identification have already been described.

At 225, the identified data samples are filtered out from the data set, by deletion, masking, flags, or some other suitable procedure for preventing their involvement in later analysis.

At 230, the filtered data set is analyzed, for example by the KPI analyzer 133.

Specifically, at 231, the data samples of the filtered data set are analyzed against a selected key performance indicator (KPI), to determine whether the behavior of the VCU, according to the data samples, is in compliance with the KPI.

At 233, it is checked whether there are more KPIs to review. If so ("Yes" at 233), the analysis returns to 231 to analyze against another KPI, while if not ("No" at 233), the analysis continues.

At 235, it is checked whether there was any KPI "failure"; that is, whether the behavior of the VCU was determined not to be in compliance with at least one of the KPIs. If not ("No" at 235), the process ends immediately (a report of the analysis results may be generated). If there was a failure ("Yes" at 235), the process continues to 240.

At 240, in accordance with the analyzing of the filtered data set—more specifically, on the basis of the detected KPI failures—the VCU is optimized, for example by the VCU optimizer 135.

Specifically, at 241, an optimized configuration file is generated for the VCU. The optimized configuration file may, for example, reassign at least one function, and therefore a portion of the processing load, from the servers of the server cluster to the baseband units of the base stations, or vice versa. Such redistribution may be according to a KPI failure indicating that the current distribution is overloading one subsystem or the other, or indicating that a particular function is better managed by a different subsystem. At 243, the configuration file is transmitted to the server cluster and applied to the VCU installations within.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
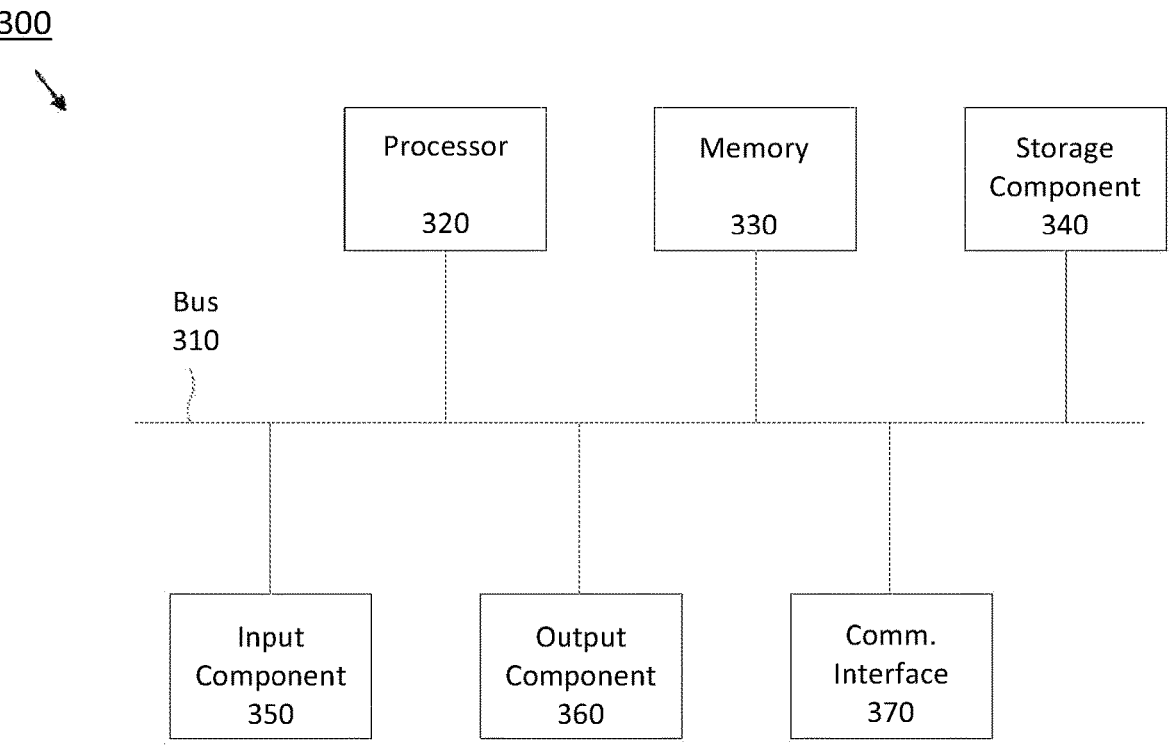
FIG. 3 is a diagram of example components of a device on which embodiments of the systems and/or methods described herein may be implemented.

FIG. 3 is a diagram of example components of a device 300. Device 300 may correspond to any server 120 of the server cluster, and/or any baseband unit 111. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 2:
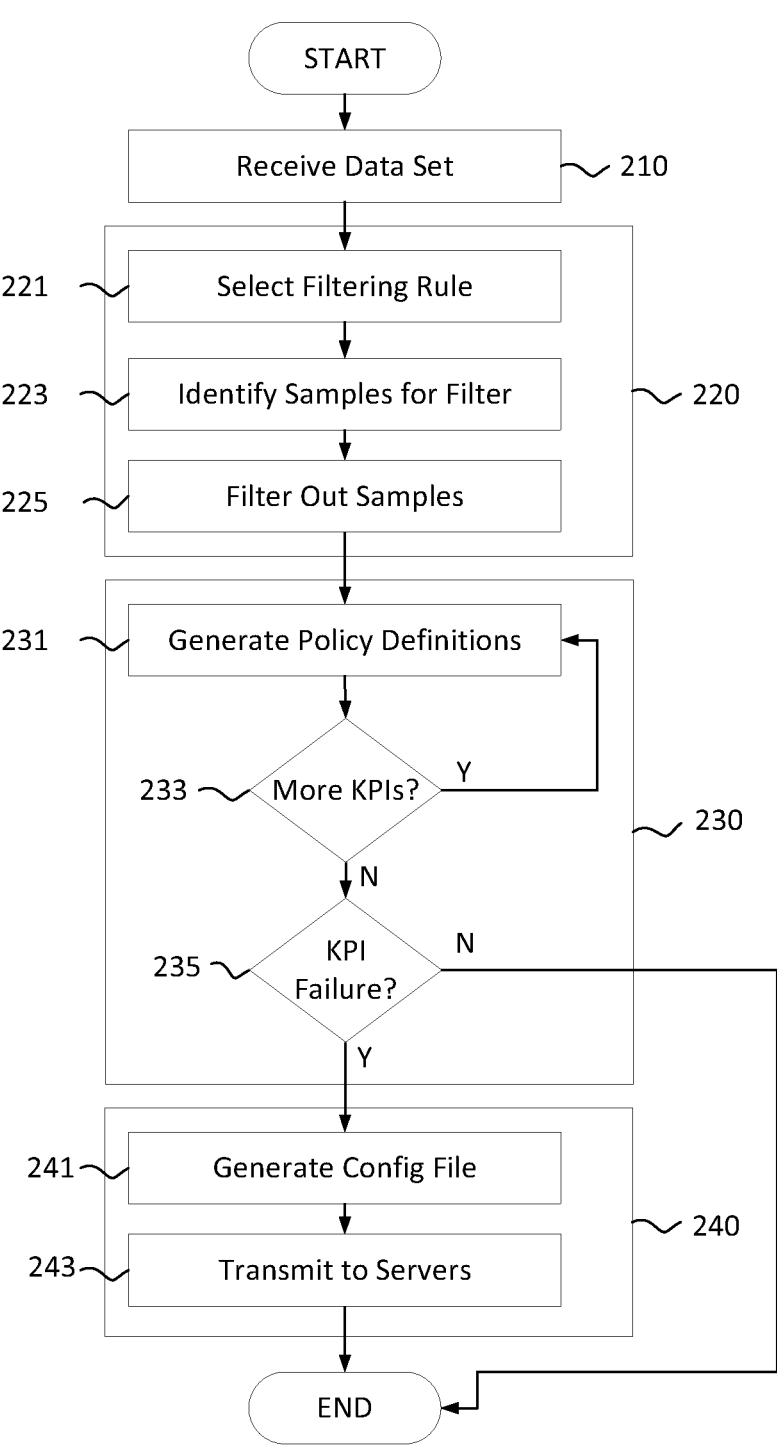
FIG. 2 is a flow diagram illustrating a flow of processes for isolating software performance issues in a wireless communication network, in accordance with an exemplary embodiment.

In embodiments, any one of the operations or processes of FIG. 2 may be implemented by or using any one of the elements illustrated in FIG. 3.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for isolating software performance issues in a wireless communication network, the method comprising:

establishing a server cluster including at least one server processor, the server processor executing a virtual control unit (VCU) thereon, the VCU configured to selectively control at least one of a plurality of base stations of the wireless communication network;

establishing a data set including a plurality of data samples, each data sample being collected by a user device communicatively coupled to the wireless communication network, each data sample describing features of a communication of the user device with one of the plurality of base stations of the wireless communication network;

by a processor, selectively filtering the plurality of data samples of the data set according to at least one filtering rule to generate a filtered data set, the filtering rule identifying data samples indicating an undesired performance impact by at least one factor unrelated to the VCU;

by a processor, analyzing the filtered data set to determine compliance of the VCU with at least one performance indicator; and by a processor, optimizing a configuration of the VCU for efficient distribution of processing load between the server cluster and the plurality of base stations, the optimizing being performed according to the analyzing of the filtered data set, and by generating and applying an optimized configuration file to the VCU.

2. The method of claim 1, wherein the filtering rule identifies data samples according to a signal strength value.

3. The method of claim 1, wherein the filtering rule identifies data samples according to a noise value.

4. The method of claim 1, wherein the filtering rule identifies data samples according to a base station indicated by the data sample.

5. The method of claim 1, wherein the filtering rule identifies data samples according to a frequency band indicated by the data sample.

6. The method of claim 1, wherein the filtering rule identifies data samples according to a travel route indicated by the data sample.

7. The method of claim 1, wherein the selective filtering of the plurality of data samples is additionally according to at least a second filtering rule identifying data samples irrelevant to software performance.

8. A non-transitory computer-readable recording medium having recorded thereon instructions executable by at least one processor to perform a method for isolating software performance issues in a wireless communication network, the wireless communication network including a server cluster including at least one server processor, the server processor executing a virtual control unit (VCU) thereon, the VCU configured to selectively control at least one of a plurality of base stations of the wireless communication network, the performed method including:

receiving a data set including a plurality of data samples, each data sample being collected by a user device communicatively coupled to the wireless communication network, each data sample describing features of a communication of the user device with one of the plurality of base stations of the wireless communication network;

selectively filtering the plurality of data samples of the data set according to at least one filtering rule to generate a filtered data set, the filtering rule identifying data samples indicating an undesired performance impact by at least one factor unrelated to the VCU;

analyzing the filtered data set to determine compliance of the VCU with at least one performance indicator; and optimizing a configuration of the VCU for efficient distribution of processing load between the server cluster and the plurality of base stations, the optimizing being performed according to the analyzing of the filtered data set, and by generating and applying an optimized configuration file to the VCU.

9. An electronic device for isolating software performance issues in a wireless communication network, the electronic device comprising:

at least one memory configured to store computer program code; and at least one processor configured to operate as instructed by the computer program code, the computer program code including:

reception code configured to cause at least one of the at least one processor to receive a data set including a plurality of data samples, each data sample being collected by a user device communicatively coupled to the wireless communication network, each data sample describing features of a communication of the user device with one of a plurality of base stations of the wireless communication network, wherein at least one server processor of the wireless communication network executes a virtual control unit (VCU) thereon to selectively control at least one of the plurality of base stations, filtering code configured to cause at least one of the at least one processor to selectively filter the plurality of data samples of the data set according to at least one filtering rule to generate a filtered data set, the filtering rule identifying data samples indicating an undesired performance impact by at least one factor unrelated to the VCU, analysis code configured to cause at least one of the at least one processor to analyze the filtered data set to determine compliance of the VCU with at least one performance indicator, and optimization code configured to cause at least one of the at least one processor to optimize a configuration of the VCU for efficient distribution of processing load between the server cluster and the plurality of base stations, the optimizing being performed according to the analyzing of the filtered data set, and by generating and applying an optimized configuration file to the VCU.

10. The electronic device of claim 9, wherein the filtering rule identifies data samples according to a signal strength value.

11. The electronic device of claim 9, wherein the filtering rule identifies data samples according to a noise value.

12. The electronic device of claim 9, wherein the filtering rule identifies data samples according to a base station indicated by the data sample.

13. The electronic device of claim 9, wherein the filtering rule identifies data samples according to a frequency band indicated by the data sample.

14. The electronic device of claim 9, wherein the filtering rule identifies data samples according to a travel route indicated by the data sample.

15. The electronic device of claim 9, wherein the selective filtering of the plurality of data samples is additionally according to at least a second filtering rule identifying data samples irrelevant to software performance.

* * * * *